(12) United States Patent
Asgeirsson

(10) Patent No.: US 8,311,971 B2
(45) Date of Patent: Nov. 13, 2012

(54) BATCHING METHOD

(75) Inventor: Agni Asgeirsson, Kopavogur (IS)

(73) Assignee: Marel HF, Gardabaer (IS)

( * ) Notice: Subject to any disclaimer, the term of this patent is extended or adjusted under 35 U.S.C. 154(b) by 746 days.

(21) Appl. No.: 11/919,327

(22) PCT Filed: Apr. 27, 2006

(86) PCT No.: PCT/IS2006/000009
§ 371 (c)(1),
(2), (4) Date: Sep. 23, 2009

(87) PCT Pub. No.: WO2006/114798
PCT Pub. Date: Nov. 2, 2006

(65) Prior Publication Data
US 2010/0017355 A1      Jan. 21, 2010

(30) Foreign Application Priority Data
Apr. 28, 2005   (IS) ................................. 7828

(51) Int. Cl.
G06F 17/00   (2006.01)
G06N 7/04   (2006.01)
(52) U.S. Cl. ........................................................ 706/54
(58) Field of Classification Search .................. None
See application file for complete search history.

(56) References Cited

U.S. PATENT DOCUMENTS 5,109,936 A    5/1992  Ruppl
2004/0176874 A1*  9/2004  Kvisgaard et al. ............ 700/240

FOREIGN PATENT DOCUMENTS

WO    00/23772    4/2000
WO    03/069285   8/2003

OTHER PUBLICATIONS

International Search Report for International Application No. PCT/IS2006/000009, mailed Jun. 19, 2007.
Notification of Transmittal of the International Preliminary Report on Patentability, mailed Jun. 4, 2007.

* cited by examiner

Primary Examiner — Kakali Chaki
Assistant Examiner — Luis Sitiriche
(74) Attorney, Agent, or Firm — Nixon & Vanderhye PC

(57) ABSTRACT

A method for decision aiding in batching of items of varying weight, size, or shape into packs of fixed weight and item count, said method characterized by controlling the average weight of items used, by rejecting selected portion of the available pool of items, according to calculated 'Optimal Usage Curve', wherein the 'Optimal Usage Curve' represents the 'overweight of batches' as a function of the 'ratio of items used', the 'overweight of batches' represents the average batch weight while the 'ratio of items used' is the number of items used in the batching process over the total number of items in the pool of items.

7 Claims, 4 Drawing Sheets

BATCHING METHOD

This application is the U.S. national phase of International Application No. PCT/IS2006/000009 filed 27 Apr. 2006 which designated the U.S. and claims priority to IS 7828 filed 28 Apr. 2005, the entire contents of each of which are hereby incorporated by reference.

TECHNICAL FIELD

The present invention relates to the batching of items into packs of fixed item characteristics and item count.

BACKGROUND ART

In various industries, items are sold in batches satisfying various constraints. As an example, items of non-uniform size, shape or weight, e.g. food items such as meat, fish, fruit and vegetables, are typically handled and delivered to customers in batches having a substantially uniform size, shape and weight. Typically, a batch of items must fulfill requirements defined by a contract between a delivering and a receiving part, and most often, minimum weight of the batch is a key issue. Normally, the part of the batch that exceeds the minimum weight is considered by the delivering part as a loss and is often referred to as "giveaway", overweight or "overpack".

Typically, batches are formed by weighing the items individually, e.g. as they are moved by a conveyer system across a dynamic scale. In a computer system, the weight of each item is compared with weights of a plurality of receptacles, e.g. bins wherein batches are formed. Often, the computer system uses statistical algorithms for assigning specific items to specific bins under consideration of required minimum weight of the batch and a desire not to produce batches with more overweight, i.e. giveaway, than required under the present conditions, i.e. given the weights of the items and the required minimum weight of the batches.

Evidently, there is a correlation between the amount of giveaway, the required minimum weight of the batches, and the weight distribution of the items being batched. In general, the larger the items are and the smaller the batches are, the more giveaway is expected.

U.S. Pat. No. 6,388,209 discloses a method to automatically and accurately portion a sequential flow of items by weight. The method uses a pool of individual items of known weight to select from in order to perform batches.

WO2003008917 discloses a method using two flows of items to create batches. One flow is used for coarse filling up of the batches while the other flow of items, "fine flow", is used to fill up the batches. The fine flow consists of a sequence of n-items. The weight of the items is registered by a weighing means and stored. Information from the weight distribution of the n-items is then used to accurately batch to a final batch weight with minimum overweight.

Existing systems for batching items, e.g. conveyor systems for continuous batching of food items, are sometimes provided with a computer system, which is capable of registering certain process parameters, e.g. the batching throughput, e.g. determined in weight units or determined in numbers of pieces per time unit.

GB2116732 entitled "Distributing bodies of different weight to units of predetermined weight", discloses a method and apparatus for batching items. Attempts to solve this problem using information from dynamic weighing system to batch items based thereon.

It is, however, very difficult even for skilled operators to evaluate the performance of the system. As an example, an operator may be satisfied by knowing that a large number of batches are formed within a certain time unit, while he never realizes that the amount of giveaway or the amount of batches with underweight is large, and even if control weighing of the batches reveals the truth, the complex nature of the batching process makes it difficult to determine the reason for the large number of batches with overweight or underweight, neither to say if the situation is better or worse than expected.

One reason for an undesirable result could be that the weight distribution of the items is not suitable for the batch or pack size being processed and another reason could be that a scale is out of order. In the existing systems for batching, it is therefore difficult to optimize the batching process, e.g. with the objective to minimize giveaway.

The present invention provides a tool to aid in the optimization of the batching process.

DISCLOSURE OF INVENTION

Batching methods can be used to batch items into batches of fixed weight and item count. As an example the goal might be to make batches weighing 300 grams (BatchMinWeight) and exactly 3 items (ItemCount). In this case there is a fixed relationship between the average item weight (AverageItemWeight) and the average batch weight (AverageBatchWeight):

$$AverageBatchWeight = ItemCount \times AverageItemWeight$$

Therefore, the average overweight equals (AverageOverWeight):

$$AvearageOverWeight = AverageBatchWeight - BatchMinWeight$$

$$\therefore$$

$$AvearageOverWeight = ItemCount \times AverageItemWeight - BatchMinWeight$$

The present invention provides an intelligent batching method which controls the average weight of the items used in the batching process. The method cannot, of course, control the average piece weight of the incoming pieces, but instead makes the best use of what is being offered. The method controls the average weight of items used (AverageWeightOfItemsUsed) in the batching process by rejecting (not using) selected portion of the available pool of items.

Therefore, the present invention discloses a method for decision aiding in batching of items of varying weight, size, shape, or other characterizing feature into batches of fixed weight, said method is characterized by controlling the average weight of items used, by rejecting selected portion of the available pool of items, according to calculated "Optimal Usage Curve", wherein the "Optimal Usage Curve" represents the "Overweight Of Batches" as a function of the "Ratio Of Items Used", the "Overweight Of Batches" represents the average batch weight while the "Ratio Of Items Used" is the number of items used in the batching process over the total number of items in the pool of items.

DETAILED DESCRIPTION OF THE INVENTION

For aiding in the control of batching process it is helpful to know the minimum ratio of items that must be rejected to achieve a desired average batch weight.

The current invention proposes a method for decision aiding in batching of items of varying weight, size, shape, or other characterizing feature into packs of fixed weight. The method is controls the average weight of the items used for batching by rejecting selected portion of the items available for batching. The selection is based on a plot of points, see FIG. 1, forming a curve which represents the optimal usage of items with respect to batch overweight. In this application we call this curve the "Optimal Usage Curve".

The "Optimal Usage Curve" is obtained by the following steps:

First the items 1 to n, from the pool of items are arranged in a queue according to their weight in descending order. Then the average item weight is calculated for the items in the queue. The result represents the first point in the "Optimal Usage Curve". To calculate the next point the first item, which is also the heaviest item, in the queue is removed and the average of the remaining items is calculated, and so on until the queue is empty. This method can be represented by the following pseudo code where:

---

Q = ordered queue of items
OUC = is an array of points representing the "Optimal Usage Curve"
n = the maximum number of items in the queue
for i = 1..n begin
    OUC[i]= average(Qi..n)
end

---

The method presented above is not presented to limit the scope of the invention, but rather to present just one of many different ways to reach the same "Optimal Usage Curve" and, therefore, the same end result.

In the current invention the "Optimal Usage Curve" can be calculated in myriad of different ways, for example:
  based on known statistical information about the product before the product is processed,
  based on information gathered on the fly as the product is being processed,
  based on historical data from previous processes,
  or any combination of the above.

The different information mentioned above are not intended to limit the scope of the invention, but rather to highlight the versatility of information the method can take advantage of.

Figure 2:
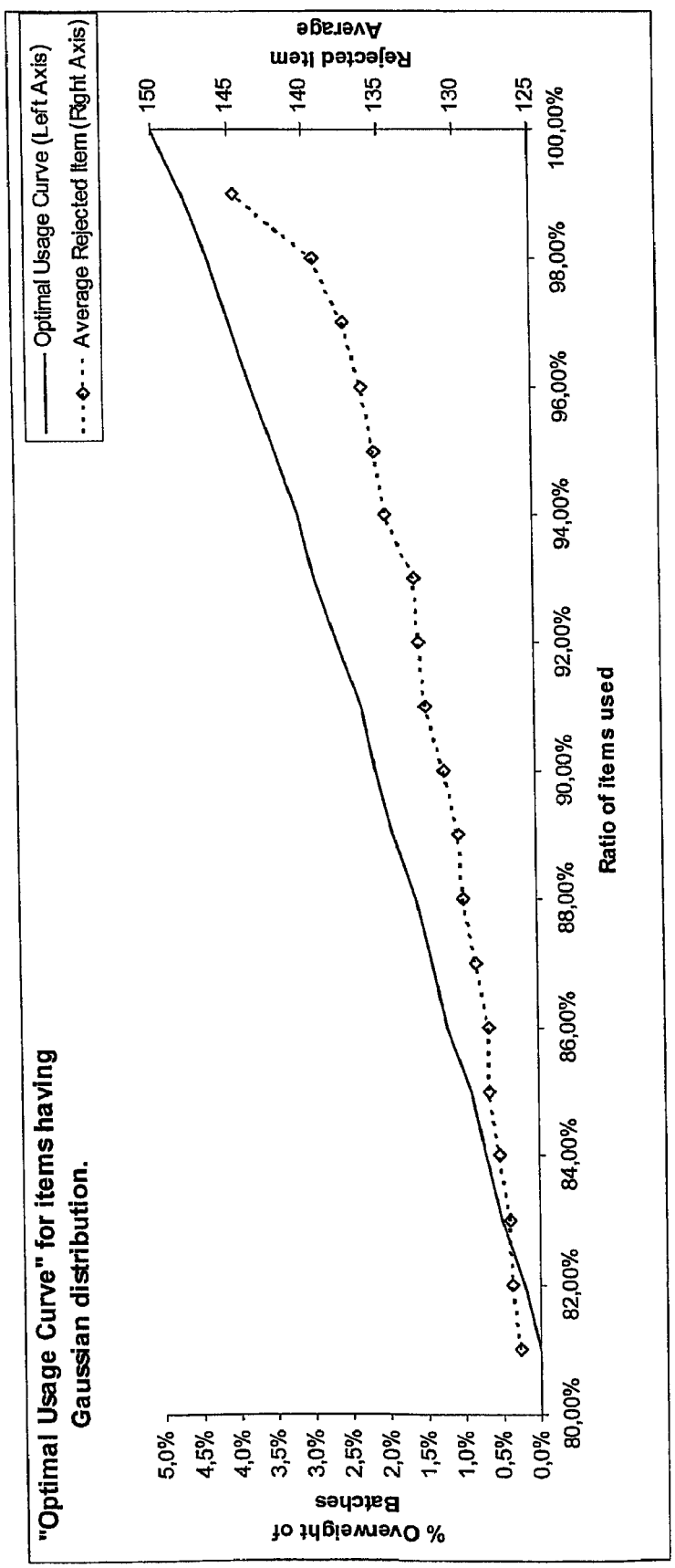
FIG. 2 shows the "Optimal Usage Curve" along with curve showing the average weight of the rejected items.
Figure 3:
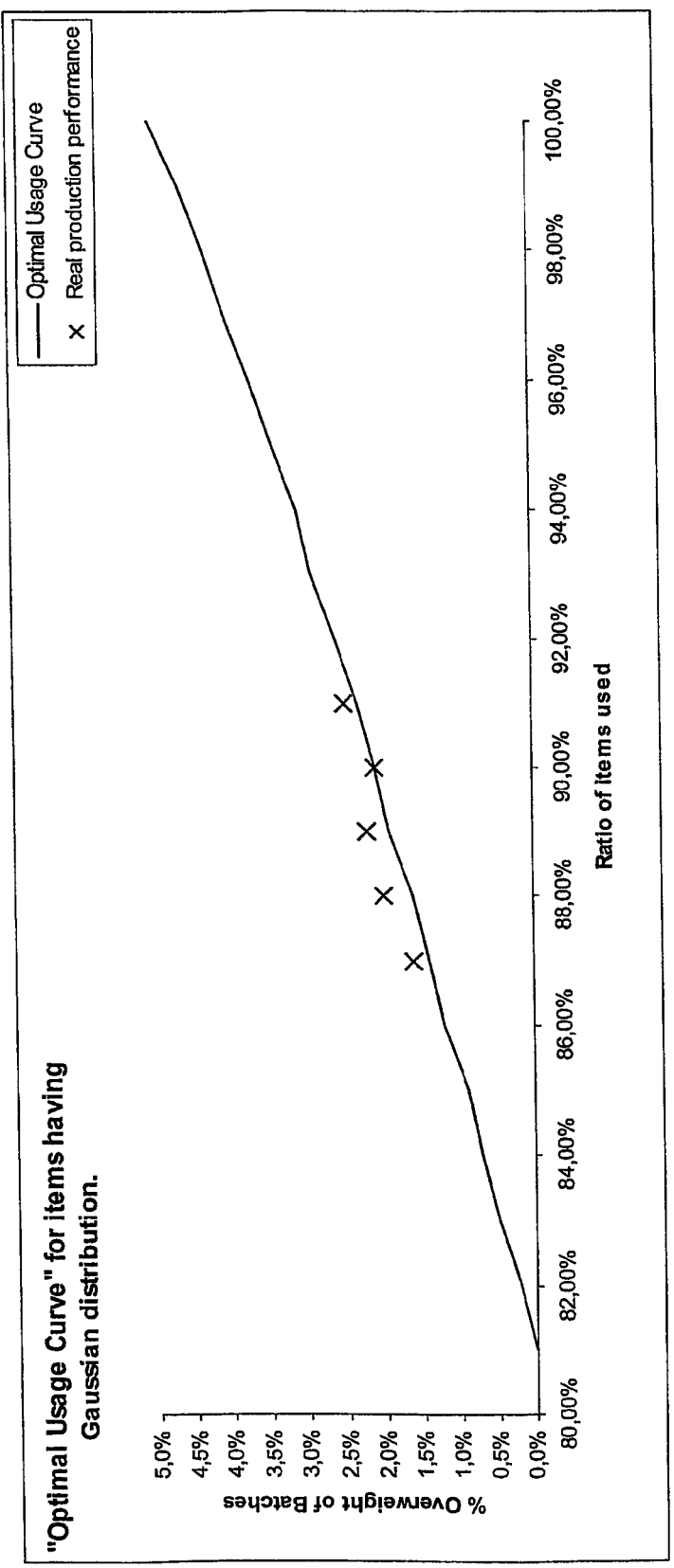
FIG. 3 shows the "Optimal Usage Curve" along with results from real production performance data.
Figure 4:
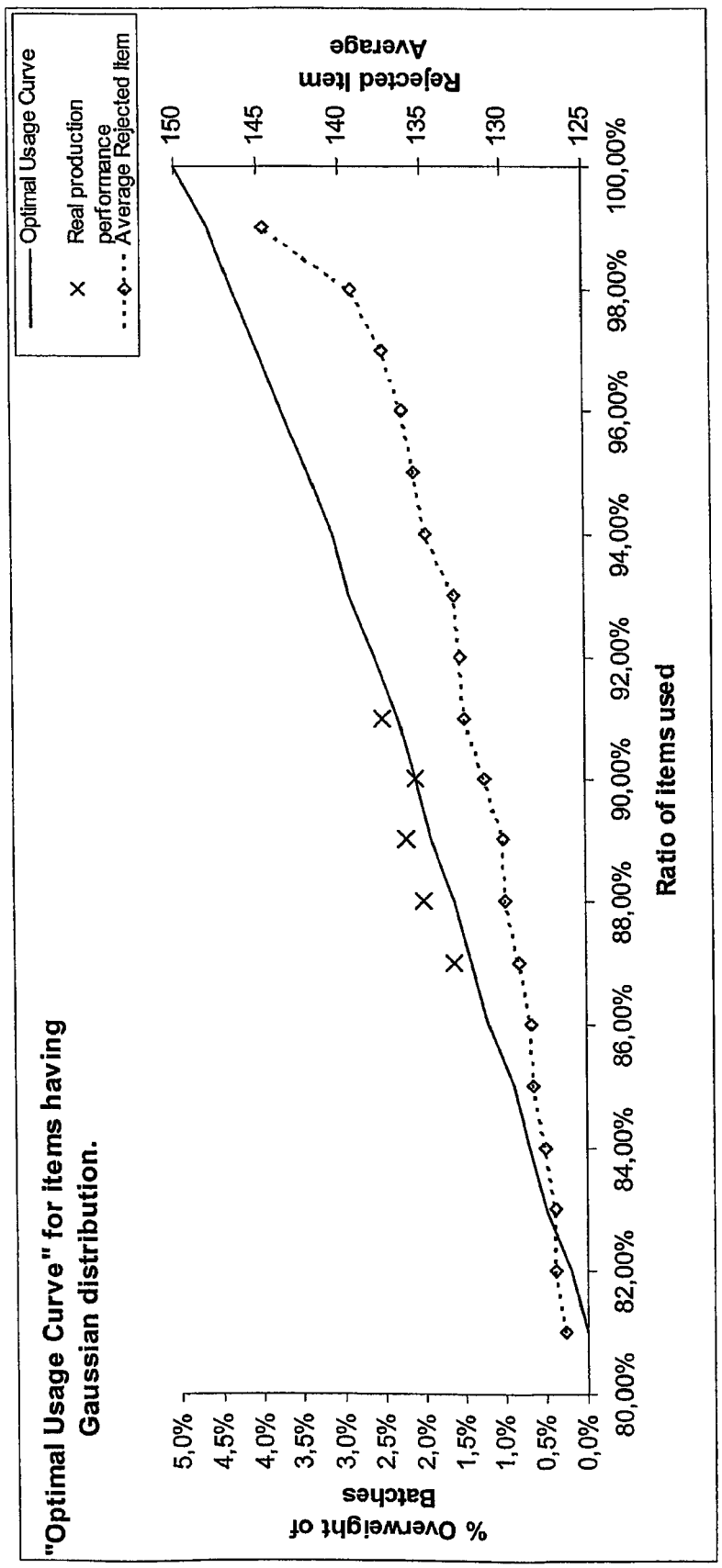
FIG. 4 shows the "Optimal Usage Curve" along with a curve showing the average weight of the rejected items as well as results from real production performance data.

To further aid in the decision process a curve representing the average weight of rejected items, see FIG. 2, can be superimposed on the same graph as the "Optimal Usage Curve" as well as points representing previous production results, see FIG. 3. The combination of all three graphs as shown in FIG. 4 is also possible and aids even further in the decision process.

The method of obtaining the "Optimal Usage Curve" can further be encoded in a computer executable program code.

INDUSTRIAL APPLICABILITY

The ultimate goal of any for-profit company is to make money. Optimal utilization of the raw material available is therefore of major interest. In the food packing industry the goal is often to minimize the overweight (or giveaway) in each product pack.

For example, if the minimum weight of batches to be sold is 300 grams, and 3 items are required for each batch, while the average weight of the available items is 105 grams the batch average will be 315 grams. Therefore, it will be of great interest for the company to reduce the incoming item average to 100 grams to yield batches of 300 grams. This is, however, not possible in many cases. In most cases the items are provided with some average item weight and some deviation from the mean.

Figure 1:
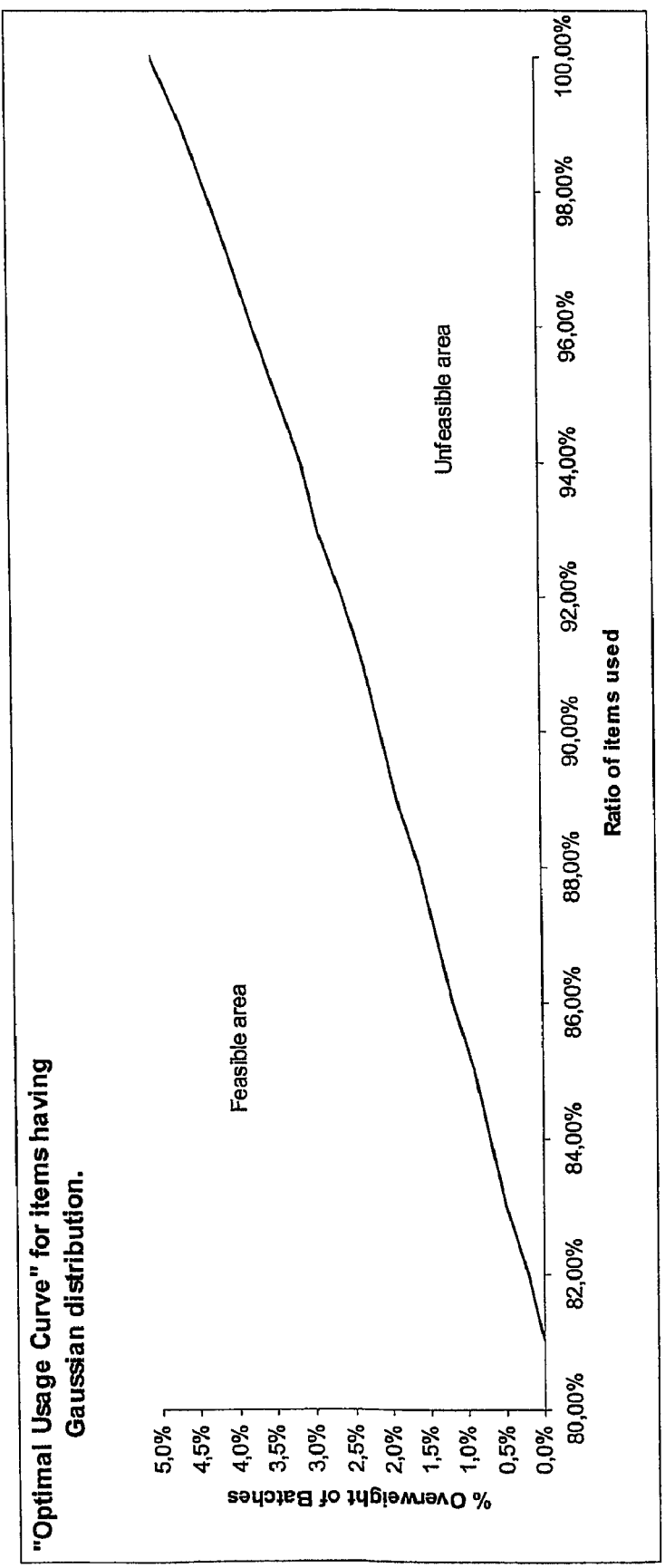
FIG. 1 shows the "Optimal Usage Curve"

FIG. 1 shows an example of the "Optimal Usage Curve" assuming that the item distribution has Gaussian distribution with an average item weight of 105 grams and a standard deviation 15 grams. The area above the curve is the operational area, meaning that if the actual results of the packing process are plotted on the graph, those points will fall on or above the curve as shown in FIG. 3. It is physically impossible to have the average performance of the batching process to fall below the curve.

MODES FOR CARRYING OUT THE INVENTION

One of the applications of the "Optimal Usage Curve" is to aid in optimizing the process yield. By inspecting the "Optimal Usage Curve" a person managing the plant can easily determine how the controls for the packing process can be modified to achieve more optimal results. For example, the manager knows that the packing process is currently utilizing 92% of the pieces and the packs have 3% overweight. From the "Optimal Usage Curve" it can be determined that optimal overweight when using 92% is 2.5%, so other process factors add an extra 0.5% to the overweight. Also from the "Optimal Usage Curve" one can see that if 6% less items are used, i.e. 86% utilizing, the optimal overweight drops to 1%, therefore expected overweight would be expected to drop to 1.5%. This information can greatly help manager to determine if the current production settings satisfy the production goals, and what can be changed to improve production. Increasing the reject rate doesn't necessary mean less utilization of the raw material. Since the rejected items can be used in most cases for different size batches.

Another application of the "Optimal Usage Curve" would be to use the program output for the autonomous process control, thereby, controlling batching of different batch sizes at the same time.

Yet another application of the "Optimal Usage Curve" is to use it for analyzing past processes and make decisions about future processes. The analysis can aid in choosing what end products best suits for different item weight distribution or different suppliers of raw material.

Yet another application of the "Optimal Usage Curve" would be to indicate the condition of the batching equipment. Over time the plant manager knows that specific average item weight and distribution results in some known average batch overweight percentage. For example, let's say 2% when the batching equipment is in good condition. If the batch overweight of the same average item weight and distribution results in 4% or 5% over weight, the plant manager knows the equipments needs to be adjusted and repaired.

The invention claimed is:
1. A method for aiding decisions in the batching of items of varying weight, size, shape, or other characterizing features into packs of fixed weight and item count, said method comprising the steps of:

controlling the average weight of items used by rejecting a selected portion of an available pool of items according to a calculated "Optimal Usage Curve", the "Optimal Usage Curve" representing an "overweight of batches" as a function of a "ratio of items used", the "overweight of batches" representing the average batch weight, and the "ratio of items used" being the number of items used in the batching process over the total number of items in the pool of items, the "Optimal Usage Curve" being obtained by the following steps:
- a) arranging the items from the pool of items in a queue according to their weight in descending order,
- b) calculating the average weight of the available pool of items in the queue, the result of the calculating representing a first point in the "Optimal Usage Curve",
- c) removing the first item in the available queue pool of items from the calculation and calculating the average weight of the remaining items in the queue, the result of the calculating representing a second point in the "Optimal Usage Curve", and
- d) repeating steps b) and c) for the remaining items in the queue and thus the remaining points in the "Optimal Usage Curve" until the queue is empty.

2. The method according to claim 1, wherein the "Optimal Usage Curve" is calculated based on known statistical information about the product to be processed.

3. The method according to claim 1, wherein the "Optimal Usage Curve" is calculated based on simulation.

4. The method according to claim 1, wherein the "Optimal Usage Curve" is calculated based on historical data from past processes.

5. The method according to claim 1, wherein a curve representing the average weight of rejected items is superimposed on the same graph as the "Optimal Usage Curve", for further aiding in the decision process.

6. The method according to claim 1, wherein points representing previous production results are superimposed on the same graph as the "Optimal Usage Curve", for further aiding in the decision process.

7. A non-transitory computer-readable storage medium containing software with computer executable instructions, which when executed by one or more computer systems, perform the steps of:

controlling the average weight of items batched into packs of fixed weight and item count, the items having varying weight, size, shape, or other characterizing features, the controlling step including rejecting a selected portion of the available pool of items according to a calculated "Optimal Usage Curve", the "Optimal Usage Curve" representing an "overweight of batches" as a function of a "ratio of items used", the "overweight of batches" representing the average batch weight, and the "ratio of items used" being the number of items used in the batching process over the total number of items in the pool of items, obtaining said "Optimal Usage Curve" by means of:
- a) arranging the items from the pool of items in a queue according to their weight in descending order,
- b) calculating the average weight of the items in the queue, the result of the calculating representing a first point in the "Optimal Usage Curve",
- c) removing the first item in the queue from the calculation and calculating the average weight of the remaining items in the queue, the result of the calculating representing a second point in the "Optimal Usage Curve", and
- d) repeating steps b) and c) for the remaining items in the queue and thus the remaining points in the "Optimal Usage Curve" until the queue is empty.

\* \* \* \* \*